United States Patent
Liu et al.

(10) Patent No.: US 11,295,768 B1
(45) Date of Patent: Apr. 5, 2022

(54) WRITER WITH LATERALLY GRADED SPIN LAYER MST

(71) Applicant: Headway Technologies, Inc., Milpitas, CA (US)

(72) Inventors: Ying Liu, San Jose, CA (US); Shohei Kawasaki, Sunnyvale, CA (US); Wenyu Chen, San Jose, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 17/029,698

(22) Filed: Sep. 23, 2020

(51) Int. Cl.
*G11B 5/235* (2006.01)
*G11B 5/23* (2006.01)
(Continued)

(52) U.S. Cl.
CPC .......... *G11B 5/3146* (2013.01); *G11B 5/1278* (2013.01); *G11B 5/23* (2013.01);
(Continued)

(58) Field of Classification Search
None
See application file for complete search history.

(56) References Cited

U.S. PATENT DOCUMENTS

| | | |
|---|---|---|
| 6,785,092 B2 | 8/2004 | Covington et al. |
| 6,809,899 B1 | 10/2004 | Chen et al. |

(Continued)

FOREIGN PATENT DOCUMENTS

| | | |
|---|---|---|
| JP | 2002133610 | 5/2002 |
| JP | 2002298309 | 10/2002 |

(Continued)

OTHER PUBLICATIONS

PTO Office Action, U.S. Appl. No. 12/964,202, Applicant: Sasaki et al., Notification date: Nov. 28, 2012, 11 pages.

(Continued)

*Primary Examiner* — Craig A. Renner
(74) *Attorney, Agent, or Firm* — Saile Ackerman LLC; Stephen B. Ackerman

(57) ABSTRACT

A spin transfer torque reversal assisted magnetic recording (STRAMR) writer is disclosed wherein a spin torque oscillator has a flux guiding layer (FGL) wherein magnetization flips to a direction substantially opposing the write gap (WG) field when sufficient current ($I_B$) density is applied across the STO between a trailing shield and main pole (MP) thereby enhancing the MP write field. A key feature is that the FGL has a center portion with a larger magnetization saturation×thickness (MsT) than in FGL outer portions proximate to STO sidewalls. Accordingly, lower $I_B$ density is necessary to provide a given amount of FGL magnetization flipping and there is reduced write bubble fringing compared with writers having a FGL with uniform MsT. Lower MsT is achieved by partially oxidizing FGL outer portions. In some embodiments, there is a gradient in outer FGL portions where MsT increases with increasing distance from FGL sidewalls.

16 Claims, 10 Drawing Sheets

(51) Int. Cl.
  *G11B 5/31*    (2006.01)
  *G11B 5/127*   (2006.01)
  *G11B 5/39*    (2006.01)
  *G11B 5/00*    (2006.01)

(52) U.S. Cl.
  CPC .............. *G11B 5/235* (2013.01); *G11B 5/314* (2013.01); *G11B 5/3163* (2013.01); *G11B 5/3912* (2013.01); *G11B 5/3916* (2013.01); *G11B 2005/0024* (2013.01)

(56) References Cited

U.S. PATENT DOCUMENTS

| | | |
|---|---|---|
| 6,954,340 B2 | 10/2005 | Shukh et al. |
| 7,009,812 B2 | 3/2006 | Hsu et al. |
| 7,589,600 B2 | 9/2009 | Dimitrov et al. |
| 7,724,469 B2 | 5/2010 | Gao et al. |
| 7,835,111 B2 | 11/2010 | Flint et al. |
| 7,957,098 B2 | 6/2011 | Kamada et al. |
| 7,963,024 B2 | 6/2011 | Neuhaus |
| 7,978,442 B2 | 7/2011 | Zhang et al. |
| 7,982,996 B2 | 7/2011 | Smith et al. |
| 8,027,110 B1 | 9/2011 | Yamanaka et al. |
| 8,064,244 B2 | 11/2011 | Zhang et al. |
| 8,068,312 B2 | 11/2011 | Jiang et al. |
| 8,154,825 B2 | 4/2012 | Takashita et al. |
| 8,203,389 B1 | 6/2012 | Zhou et al. |
| 8,264,792 B2 | 9/2012 | Bai et al. |
| 8,270,112 B2 | 9/2012 | Funayama et al. |
| 8,295,008 B1 | 10/2012 | Sasaki et al. |
| 8,310,787 B1 | 11/2012 | Sasaki et al. |
| 8,320,079 B2 | 11/2012 | Iwasaki et al. |
| 8,427,781 B1 | 4/2013 | Sasaki et al. |
| 8,446,690 B2 | 5/2013 | Alex et al. |
| 8,462,461 B2 | 6/2013 | Braganca et al. |
| 8,477,452 B2 | 7/2013 | Sasaki et al. |
| 8,493,687 B2 | 7/2013 | Sasaki et al. |
| 8,582,240 B1 | 11/2013 | Chen et al. |
| 8,582,241 B1 | 11/2013 | Yu et al. |
| 8,604,886 B2 | 12/2013 | Nikonov et al. |
| 8,634,163 B2 | 1/2014 | Tanabe et al. |
| 8,749,919 B2 | 6/2014 | Sasaki et al. |
| 8,767,347 B1 | 7/2014 | Sasaki et al. |
| 8,792,210 B2 | 7/2014 | de la Fuente et al. |
| 9,135,933 B2 | 9/2015 | Nunokawa et al. |
| 9,142,228 B2 | 9/2015 | Fujita et al. |
| 9,202,528 B2 | 12/2015 | Furukawa et al. |
| 9,230,571 B1 | 1/2016 | Chen et al. |
| 9,299,367 B1 | 3/2016 | Tang et al. |
| 9,355,654 B1 | 5/2016 | Mallary |
| 9,355,655 B1 | 5/2016 | Udo et al. |
| 9,361,912 B1 | 6/2016 | Liu et al. |
| 9,406,316 B2 | 8/2016 | Urakami et al. |
| 9,406,317 B1 | 8/2016 | Tang et al. |
| 9,466,319 B1 | 10/2016 | Tang et al. |
| 9,666,216 B1 | 5/2017 | Kobayashi et al. |
| 9,792,933 B2 | 10/2017 | Koizumi et al. |
| 9,824,701 B2 | 11/2017 | Tang et al. |
| 9,934,797 B2 | 4/2018 | Takahashi et al. |
| 9,966,091 B2 | 5/2018 | Chen et al. |
| 10,032,469 B2 | 7/2018 | Lim et al. |
| 10,032,470 B1 | 7/2018 | Degawa et al. |
| 10,037,772 B2 | 7/2018 | Okamura et al. |
| 10,325,618 B1 | 6/2019 | Wu et al. |
| 10,446,178 B1 | 10/2019 | Tang et al. |
| 10,490,216 B1 | 11/2019 | Chen et al. |
| 10,714,129 B1 | 7/2020 | Tang et al. |
| 2002/0034043 A1 | 3/2002 | Okada et al. |
| 2004/0150910 A1 | 8/2004 | Okada et al. |
| 2005/0128637 A1 | 6/2005 | Johnston et al. |
| 2005/0141137 A1 | 6/2005 | Okada et al. |
| 2006/0044682 A1 | 3/2006 | Le et al. |
| 2006/0087765 A1 | 4/2006 | Iwakura et al. |
| 2006/0103978 A1 | 5/2006 | Takano et al. |
| 2007/0177301 A1 | 8/2007 | Han et al. |
| 2008/0013209 A1 | 1/2008 | Sasaki et al. |
| 2008/0088972 A1 | 4/2008 | Sasaki et al. |
| 2009/0059426 A1 | 3/2009 | Sasaki et al. |
| 2009/0080106 A1 | 3/2009 | Shimizu et al. |
| 2009/0128953 A1 | 5/2009 | Jiang et al. |
| 2009/0296275 A1 | 12/2009 | Sasaki et al. |
| 2010/0165517 A1 | 7/2010 | Araki et al. |
| 2011/0211271 A1 | 9/2011 | Ng et al. |
| 2011/0279921 A1 | 11/2011 | Zhang et al. |
| 2012/0120518 A1* | 5/2012 | Matsubara et al. .. G11B 5/3146 360/55 |
| 2012/0126905 A1 | 5/2012 | Zhang et al. |
| 2012/0292723 A1 | 11/2012 | Luo et al. |
| 2012/0314326 A1 | 12/2012 | Takeo et al. |
| 2013/0082787 A1 | 4/2013 | Zhang et al. |
| 2014/0071562 A1 | 3/2014 | Chen et al. |
| 2014/0133048 A1 | 5/2014 | Shiimoto et al. |
| 2014/0160598 A1 | 6/2014 | Takashita et al. |
| 2014/0177092 A1 | 6/2014 | Katada et al. |
| 2015/0043106 A1 | 2/2015 | Yamada et al. |
| 2015/0092292 A1 | 4/2015 | Furukawa et al. |
| 2015/0124347 A1 | 5/2015 | Shimoto et al. |
| 2016/0035375 A1 | 2/2016 | Gao |
| 2016/0086623 A1 | 3/2016 | Nagasaka et al. |
| 2016/0218728 A1 | 7/2016 | Zhu |
| 2017/0092304 A1 | 3/2017 | Kozumi et al. |
| 2017/0133044 A1 | 5/2017 | Lim et al. |
| 2017/0309301 A1 | 10/2017 | Takahashi et al. |
| 2018/0075868 A1 | 3/2018 | Koui et al. |
| 2019/0088275 A1 | 3/2019 | Narita et al. |
| 2020/0152228 A1 | 5/2020 | Tang et al. |

FOREIGN PATENT DOCUMENTS

| | | |
|---|---|---|
| JP | 2008021398 | 1/2008 |
| JP | 2010157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action issued in Japanese Patent Application No. 2011-149243, with English language translation.

Nov. 13, 2012, Office Action issued in Japanese Patent Application No. 2011-149244, with English language translation.

"Spin-Torque Oscillator Based on Magnetic Tunnel Junction with a Perpendicularly Magnetized Free Layer and InPlane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

US Office Action, U.S. Appl. No. 16/190,790, Applicant: Tang et al., dated Jul. 21, 2020, 6 pages.

US Notice of Allowance, U.S. Appl. No. 16/190,790, Applicant: Tang et al., dated Nov. 30, 2020, 5 pages.

US Office Action, U.S. Appl. No. 16/372,517, Applicant: Tang et al., dated Jan. 17, 2020, 12 pages.

US Notice of Allowance, U.S. Appl. No. 16/372,517, Applicant: Tang et al., dated Apr. 6, 2020, 9 pages.

US Notice of Allowance, U.S. Appl. No. 16/209,151, Applicant: Chen et al., dated Aug. 15, 2019, 8 pages.

US Notice of Allowance, U.S. Appl. No. 16/190,774, Applicant: Tang et al., dated Jun. 28, 2019, 8 pages.

* cited by examiner

WRITER WITH LATERALLY GRADED SPIN LAYER MST

RELATED PATENT APPLICATIONS

This application is related to the following: U.S. Pat. Nos. 10,446,178; 10,490,216; U.S. application Ser. No. 16/190,790, filed on Nov. 14, 2018; and U.S. application Ser. No. 16/372,517, filed on Apr. 2, 2019; assigned to a common assignee, and herein incorporated by reference in their entirety.

TECHNICAL FIELD

The present disclosure relates to a spin torque oscillator (STO) also known as a spin flipping element in a write gap (WG) of a spin torque magnetization reversal assisted magnetic recording (STRAMR) writer wherein the STO is comprised of a magnetic flux guiding layer (FGL) sandwiched between a spin preserving layer and a non-spin preserving layer, and having a higher saturation magnetization×thickness (MsT) value in a FGL center portion than in adjoining FGL outer portions to enable easier flipping and reduce bubble fringing, and wherein the FGL magnetic moment flips to an opposite direction of the write gap (WG) field when a current ($I_B$) of sufficient magnitude is applied across the STO during a write process thereby increasing the reluctance in the WG and forcing additional flux out of the main pole (MP) tip at the air bearing surface (ABS) to enhance the write field on the magnetic recording medium.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. One approach that is currently being investigated is microwave assisted magnetic recording (MAMR), which is described by J-G. Zhu et al. in "Microwave Assisted Magnetic Recording", IEEE Trans. Magn., vol. 44, pp. 125-131 (2008).

In a MAMR writer, the main pole generates a large local magnetic field to change the magnetization direction of the medium in proximity to the writer. By switching the direction of the field using a switching current that drives the writer, one can write a plurality of media bits on a magnetic recording medium. In MAMR, a spin torque oscillator (STO) is inserted in the WG, and when a critical current is applied, a STO oscillation layer is driven into a precessional state to apply a RF field on a magnetic medium bit to provide a MAMR assist by lowering bit coercivity and thereby lower the switching current necessary to provide a MP field for a write process. Magnetic flux in the main pole proceeds through the ABS and into a medium bit layer and soft underlayer (SUL). In some common designs, the flux returns to the write head through a trailing side loop comprised of a trailing shield structure, and through a leading side loop that includes a leading shield and back gap connection. There is also a gap field that exits the main pole through the write gap, side gaps, and leading gap, and is not directly responsible for writing.

Although MAMR has been in development for a number of years, it has not shown enough promise to be introduced into any products yet because of several technical problems. One problem is a fringing growth when the spin torque oscillator (STO) bias is turned on to provide a STRAMR assist. Thus, in addition to a MAMR assist at a relatively low applied current density, the oscillation layer (FGL) magnetization may flip to be anti-parallel to the WG field at a higher applied current density. As a result, the reluctance in the WG is increased thereby boosting the MP write field and the return field to the trailing shield. To counteract the tendency of a growth in fringing as the MP write field increases, a recessed STO has been proposed and is described in related U.S. Pat. No. 10,446,178.

Spin transfer (spin torque) devices are based on a spin-transfer effect that arises from the spin dependent electron transport properties of ferromagnetic (FM)-non-FM spacer-FM multilayers. When a spin-polarized current passes through a magnetic multilayer in a CPP (current perpendicular to plane) configuration, the spin angular moment of electrons from a first FM layer (FM1) that are incident on a second FM layer (FM2) interacts with magnetic moments of FM2 near the interface between the FM2 and non-FM spacer. Through this interaction, the electrons transfer a portion of their angular momentum to FM2 (i.e. FGL). As a result, spin-polarized current can switch the FM2 magnetization direction if the current density is sufficiently high.

Existing MAMR designs utilize a STO device in one or more of the write gap, leading gap, and side gaps adjoining the MP that produce a magnetization after spin flipping that substantially opposes a field in the WG, leading gap, and side gaps, respectively. Although a STO having a greater width and made of a higher Ms (saturation magnetization) material can generate a larger assist effect than a lower Ms material, the STO with the higher Ms has a FGL that is more difficult to flip. Thus, a larger applied current density is needed for FGL magnetization flipping that induces larger write bubble fringing from the STO edge corners. Accordingly, an improved STO is needed where a given amount of write assist (FGL flipping) is provided with a relatively low applied current density, and causes less write bubble fringing than with existing designs.

SUMMARY

One objective of the present disclosure is to provide a STO device in a write gap of a MAMR writer wherein FGL magnetization flipping is enhanced at a given applied current density across the STO device to provide a substantial STRAMR assist and avoiding an undesirable increase in write bubble fringing.

A second objective of the present disclosure is to provide a process of forming a STO device according to the first objective wherein the process flow uses existing methods and materials.

According to the one embodiment of the present disclosure, these objectives are achieved with a STO device having a FGL sandwiched between a non-spin preserving layer (pxL), and a spin preserving conductor layer (ppL). In the exemplary embodiment, the STO device is formed in a WG and the pxL adjoins a trailing side of the MP while the ppL contacts a side of the trailing shield (TS) that faces the MP trailing side. The FGL has a magnetization aligned in the direction of the WG field in the absence of an applied current, but oscillates with a cone angle to generate a MAMR assist when a current at a first magnitude is applied from the TS across the STO to the MP. When the applied current ($I_B$) reaches sufficient magnitude, FGL magnetization flips to an opposite direction with another cone angle that substantially opposes the WG field and generates a STRAMR assist. Accordingly, there is more reluctance in the WG, which drives more magnetic flux from the MP tip to the ABS and into a magnetic medium for improved writability. A key feature is the FGL has a center portion having a cross-track width of 5 nm to 50 nm, and with a substantially greater MsT than outer FGL portions that extend from each side of the FGL center portion to a STO sidewall. Therefore, FGL magnetization may have a greater degree of flipping at a given $I_B$ current density than in a conventional FGL wherein there is a uniform MsT. The advantage of the STO of the present disclosure is less MP (bubble) fringing because of a reduced $I_B$ necessary for a given degree of FGL flipping so that tracks per square inch (TPI) capability for the writer increases significantly compared with prior art MAMR writers.

In a preferred design, the reduced MsT in the outer FGL portion is achieved by performing a natural oxidation (NOX) process after the STO is patterned in the cross-track direction. Thus, a photoresist mask is used to determine STO width during an etch process that removes unprotected regions of STO layers, and remains in place during a subsequent NOX process where oxygen diffuses through the FGL sidewalls and towards a center of the FGL. NOX conditions are controlled so that the FGL is not oxidized in the FGL center portion. There may be an oxidation gradient (and MsT gradient) where the oxygen content decreases and MsT increases with increasing distance from each FGL sidewall until reaching a minimum and maximum value, respectively, at an interface between each outer oxidized FGL portion and the center FGL portion. Thereafter, a dielectric material is deposited to form the WG, and the photoresist mask is removed before the TS is deposited and overlying layers in the write head are formed.

In a preferred embodiment, the STO has a cross-track width that is at least 10 nm, but not more than a maximum width of the MP trailing side at the ABS. The STO has a height of 10 nm to 500 nm that represents a distance (orthogonal to the ABS) between the front side and backside, and a down-track thickness of at least 1 nm. The FGL is one or more layers of $Ni_xFe_{100-x}$, $Co_yFe_{100-y}$, $Co_zNi_{100-z}$, or alloys thereof, and where x, y, and z are from 0 to 100 atomic %. The non-spin preserving layer may be one or more of Ta, Ru, W, Pt, or Ti while the spin preserving layer is one of Cu, Ag, Au, Cr, and Al, or alloys thereof.

In an alternative embodiment, the FGL is between first and second non-magnetic layers (NM1 and NM2), and there is a spin polarization (SP) layer adjoining NM2 to give a NM1/FGL/NM2/SP STO configuration where the SP layer contacts the TS, and NM1 is on the MP trailing side. In this case, the SP layer applies spin torque to the FGL when $I_B$ is applied from the TS to the MP and thereby flips FGL magnetization to a direction substantially opposite to the WG field when $I_B$ has sufficient current density. FGL composition is maintained from the first embodiment where oxidized outer portions with lower MsT adjoin a higher MsT center portion that is unoxidized.

The present disclosure also encompasses other STO configurations with a key feature being where the outer portions of the FGL have a lower MsT than a FGL center portion, preferably by way of an oxidation process before depositing the WG.

DETAILED DESCRIPTION

Figure 1:
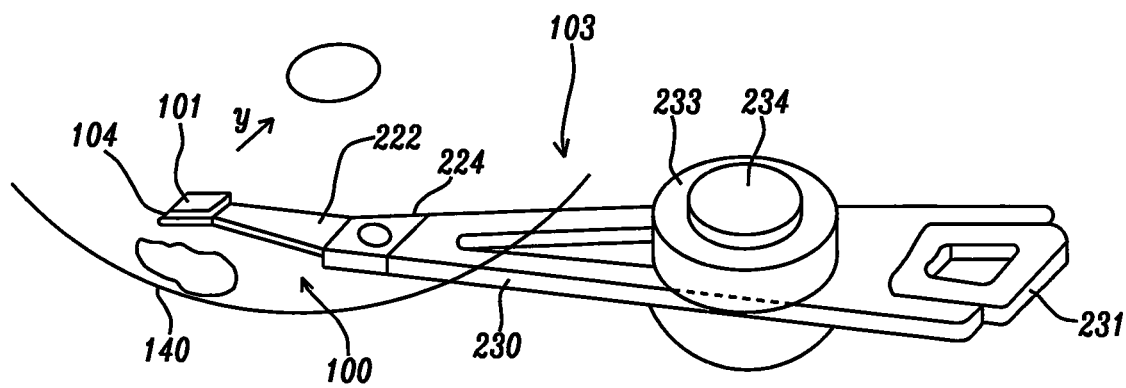
FIG. 1 is a perspective view of a head arm assembly of the present disclosure.

The present disclosure is a writer structure wherein a STO device that enables both of a STRAMR assist from FGL magnetization flipping, and a MAMR assist for writing on adjacent magnetic bits in a magnetic medium, is formed between a main pole and a trailing shield. The FGL has a center portion with a greater MsT than in FGL outer portions. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance from the ABS in the x-axis direction. In some of the drawings, a magnetic bit is considerably enlarged over actual size in order to more easily depict a magnetization therein. The term "higher degree of flipping" means that FGL magnetization is flipped closer to a direction that is pointing to the MP trailing side (anti-parallel to the WG magnetic field). The terms STO, STO device, and STO structure may be used interchangeably. Also, the terms density and magnitude may be used interchangeably when referring to applied current that flips FGL magnetization.

Referring to FIG. 1, a head gimbal assembly (HGA) 100 includes a magnetic recording head 101 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 101 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
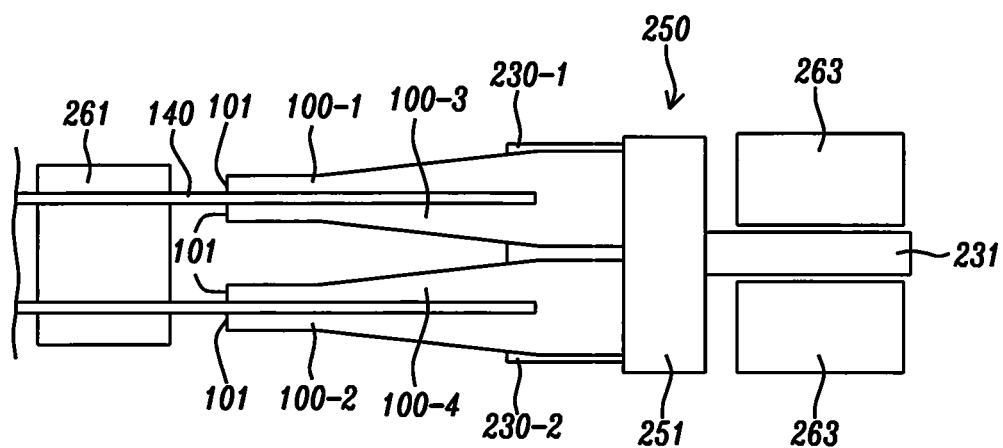
FIG. 2 is side view of a head stack assembly of the present disclosure.

Next, a side view of a head stack assembly (FIG. 2) and a plan view of a magnetic recording apparatus (FIG. 3) wherein the magnetic recording head 101 is incorporated are depicted. The head stack assembly 250 is a member to which a plurality of HGAs (HGA 100-1 and second HGA 100-2 are at outer positions while HGA 100-3 and HGA 100-4 are at inner positions) is mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
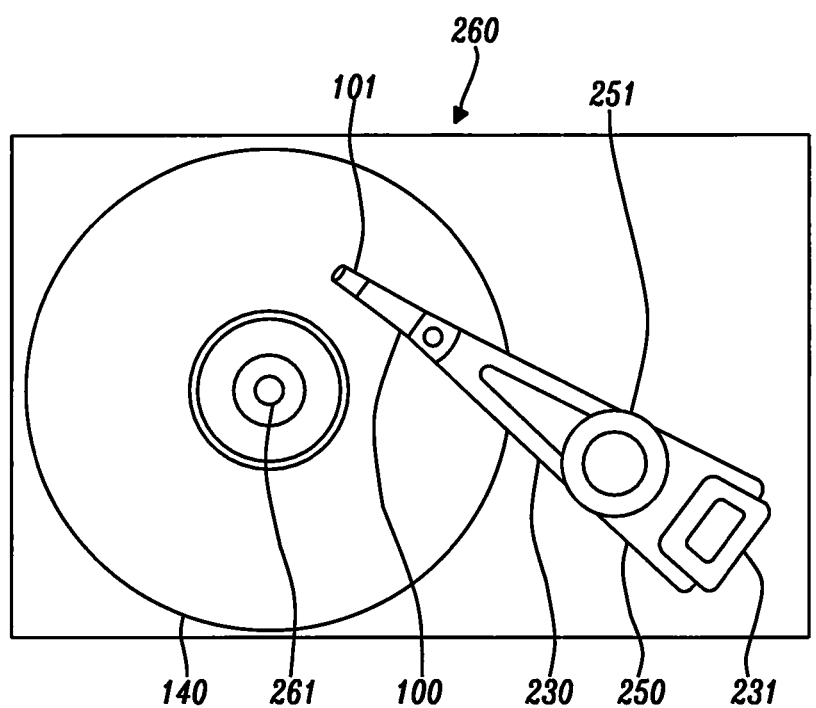
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 101 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
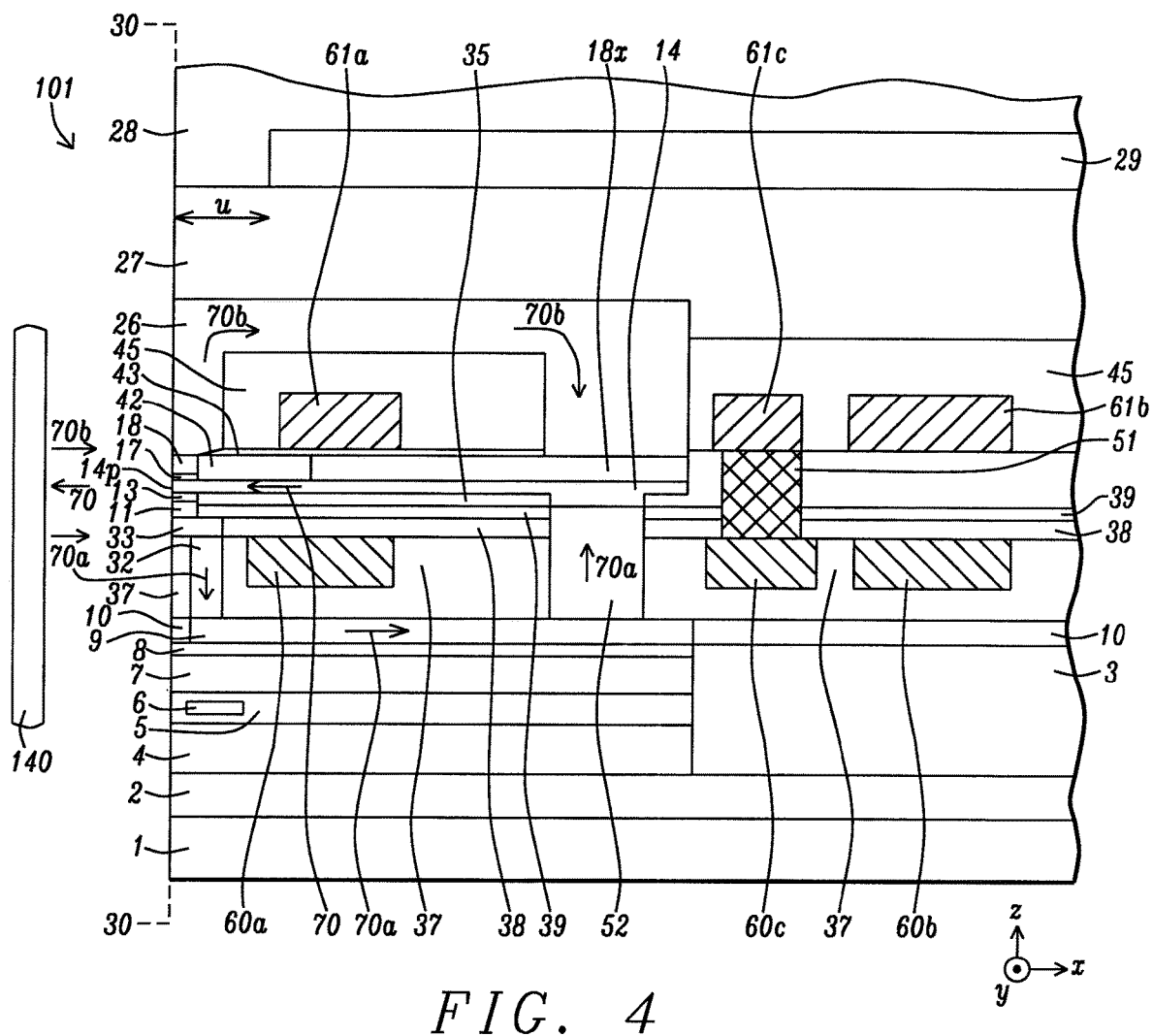
FIG. 4 is a down-track cross-sectional view of a combined read-write head with leading and trailing loop pathways for magnetic flux return to the main pole (MP) according to an embodiment of the present disclosure.

Referring to FIG. 4, magnetic recording head 101 comprises a combined read-write head. The down-track cross-sectional view is taken along a center plane (44-44 in FIG. 5A) formed orthogonal to the ABS 30-30, and that bisects the MP 14. The read head is formed on a substrate 1 that may be comprised of AlTiC (alumina+TiC) with an overlying insulation layer 2 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 4 is formed on insulation layer 2.

A magnetoresistive (MR) element also known as MR sensor 6 is formed on bottom shield 4 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 5 adjoins the backside of the MR sensor, and insulation layer 3 contacts the backsides of the bottom shield and top shield 7. The top shield is formed on the MR sensor. An insulation layer 8 and a top shield (S2B) layer 9 are sequentially formed on the top magnetic shield. Note that the S2B layer 9 may serve as a flux return path (RTP) in the write head portion of the combined read/write head. Thus, the portion of the combined read/write head structure formed below layer 9 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in MP 14 is generated with flowing a current through bucking coil 60a-c and driving coil 61a-c that are below and above the MP, respectively, and are configured in a 1+1T design. The bucking coil and driving coil each have a front portion 60a and 61a, respectively, middle portion 60c and 61c, respectively, that are connected through interconnect 51, and each have back portions 60b and 61b, respectively, that are each connected to a writer pad (not shown).

Magnetic flux 70 exits the MP at pole tip 14p at the ABS 30-30 and is used to write a plurality of bits on magnetic media 140. Magnetic flux 70b returns to the MP through a trailing loop comprised of trailing shields 17, 18, uppermost (PP3) trailing shield 26, and top yoke 18x. There is also a leading return loop for magnetic flux 70a that includes leading shield 11, leading shield connector (LSC) 33, S2 connector (S2C) 32, return path (RTP) 9, and back gap connection (BGC) 52. The magnetic core may also comprise a bottom yoke 35 below the MP. Dielectric layers 10, 13, 37-39, 42, 43, and 45 are employed as insulation layers around magnetic and electrical components. A protection layer 27 covers the PP3 TS and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head. In other embodiments (not shown), the leading return loop is shortened with the removal of the BGC, or by removing the BGC, RTP, S2C, and LSC to force more return flux 70b through the trailing loop.

Figure 5A:
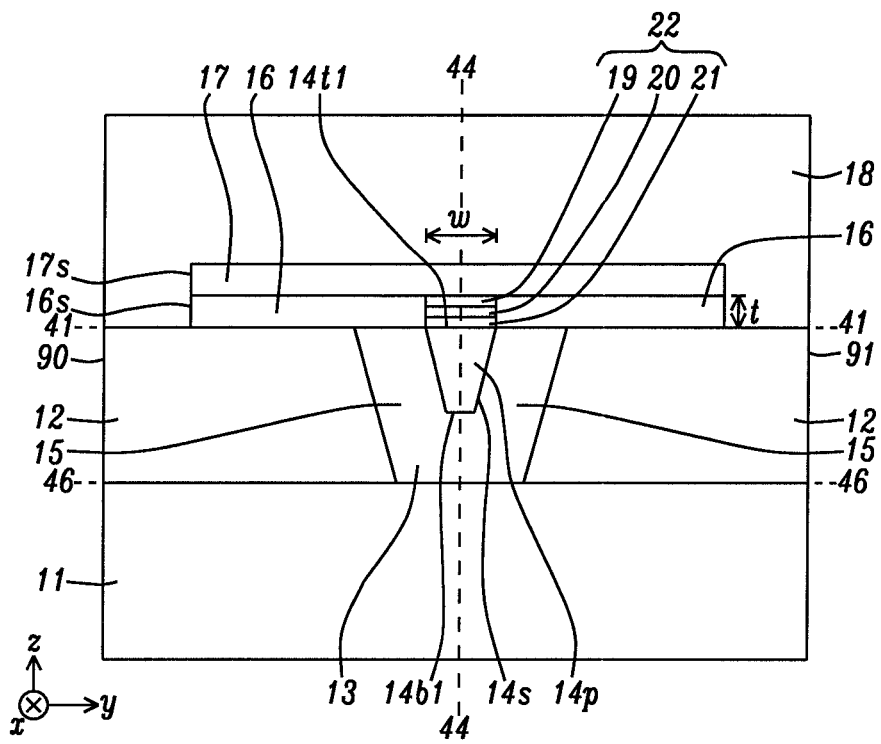
FIG. 5A shows an ABS view of a STO device formed in a WG and having a FGL above a MP trailing side.

Referring to FIG. 5A, there is a MP with MP tip 14p, trailing side 14t1, leading side 14b1, and two sides 14s formed equidistant from a center plane 44-44, and with an all wrap around (AWA) shield structure that was described in related U.S. Pat. No. 10,446,178. However, other shield structures may also be used with the STO device embodiments described herein. There is a write gap (WG) 16 with thickness t on the MP trailing side, side gaps 15 adjoining each MP side 14s, and a leading gap 13 below the MP leading side. The trailing shield structure comprises a first TS 17 with a saturation magnetization (Ms) value from 19 kiloGauss (kG) to 24 kG that is formed on the WG. The TS structure also includes a second TS 18 also known as the write shield (WS) formed on the first TS and first TS sides 17s, on WG sides 16s, and on a top surface of the side shields at plane 41-41. Plane 41-41 includes the MP trailing side at the ABS. Side shields contact a top surface of the leading shield 11 at plane 46-46 that is parallel to plane 41-41, and includes the MP leading side at the ABS. The writer is shown with outer sides 90, 91.

STO device 22 features a lower non-spin preserving layer (pxL) 21 on MP trailing side 14t1, a middle flux guiding layer (FGL) 20, and an upper spin preserving layer (ppL) 19. The pxL is a single layer or multilayer that is typically one or more of Ta, W, Pt, Ru, Ti, or Pd so that spin polarized electrons transiting the pxL will have their spin polarization randomized by spin flipping scattering. Moreover, the pxL is sufficiently thick so that the MP and FGL are not magnetically coupled. The ppL is a conductive layer and is preferably comprised of Cu, Ag, Au, Al, or Cr, or an alloy thereof in which electrons in applied current $I_B$ (FIG. 7B) will substantially retain their spin polarization when traversing the ppL.

In the exemplary embodiment, STO width w is essentially equivalent to the track width of the MP trailing side 14t1 at plane 41-41. However, in other embodiments (not shown), width w may be less than the MP track width. Preferably, STO width is at least 10 nm.

Figure 5B:
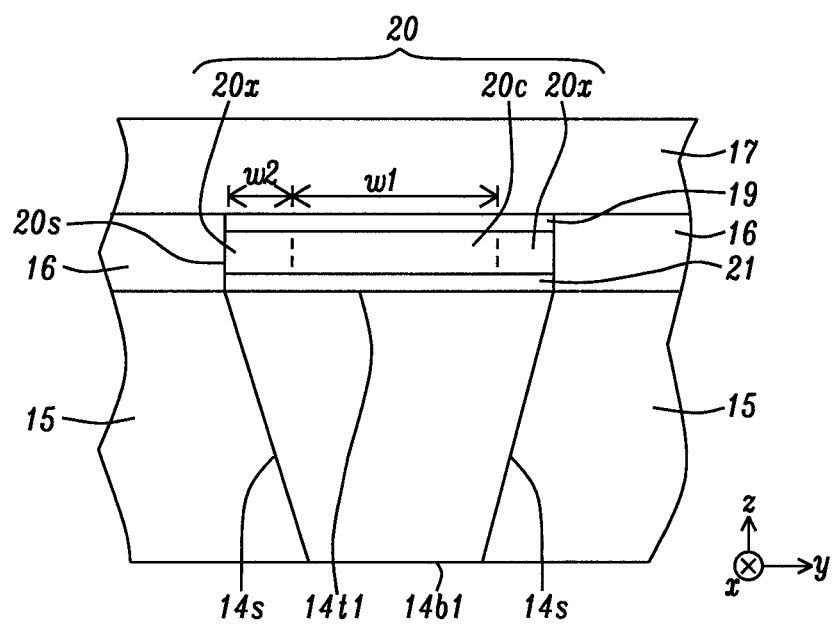
FIG. 5B is an enlarged view of the STO in FIG. 5A and depicts the FGL with outer FGL portions of width w2 and a center FGL portion of width w1 according to an embodiment of the present disclosure.

Referring to FIG. 5B that is an enlargement of the STO in FIG. 5A, FGL 20 is a magnetic layer that is preferably comprised of one or more layers of $Ni_xFe_{100-x}$, $Co_yFe_{100-y}$, $Co_zNi_{100-z}$, and where x, y, and z are from 0 atomic % to 100 atomic %, or alloys thereof with one or more additional elements. The FGL has a center portion 20c having width w1 of 5 nm to 50 nm, and a first MsT ($MsT_1$) from 1 nmT (nm×Tesla product) to 14 nmT, and an outer portion 20x having a second MsT ($MsT_2$) and adjoining each side of the FGL center portion. Each FGL outer portion has width w2 of 5 nm to 20 nm, and a $MsT_2$ from 1 nmT to 8 nmT and where $MsT_2 < MsT_1$. Furthermore, $MsT_2$ may have a gradient where $MsT_2$ increases continuously with increasing distance from STO sidewall 20s until reaching an interface with the FGL center portion. In another embodiment, $MsT_2$ is substantially uniform across each FGL outer portion. Note that the sum (2w2+w1)=w.

As described in a later section with regard to FIGS. 12-14, one preferred method of forming FGL outer portions wherein $MsT_2$ is less than $MsT_1$ in the FGL center portion is to perform a natural oxidation (NOX) process after the STO device is patterned in the cross-track direction to form sidewall 20s on each side of center plane 44-44. Thus, oxidation conditions may be controlled to give a limited oxygen diffusion length into the FGL.

Figure 6:
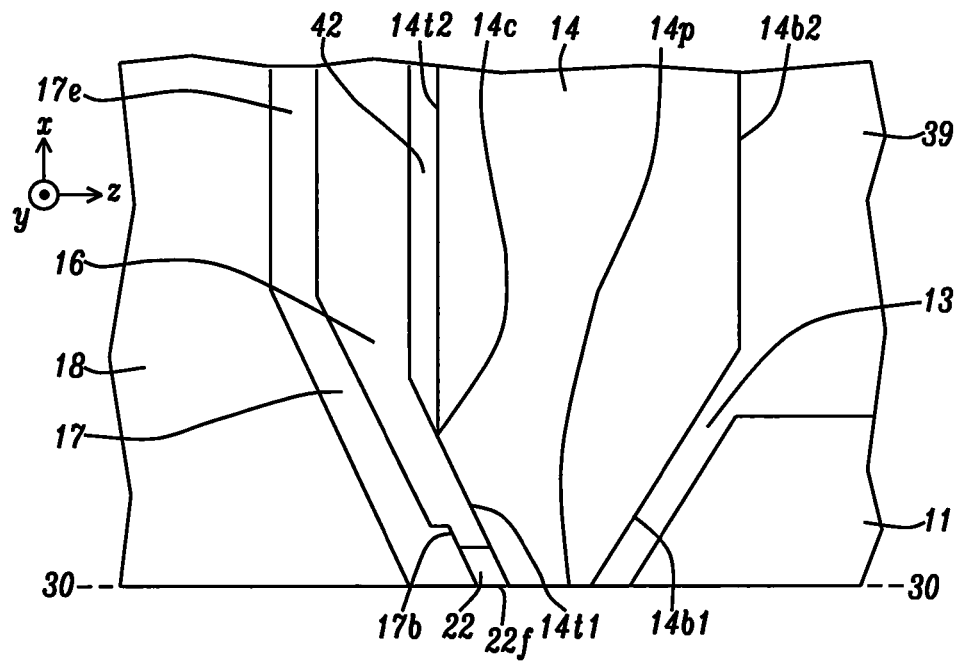
FIG. 6 is a down-track cross-sectional view of the writer structure in FIG. 5A where the STO has a front side at the ABS and is between the MP trailing side and a first trailing shield.

In FIG. 6, the down-track cross-sectional view at center plane 44-44 in FIG. 5A is illustrated and shows a portion of the writer that is proximate to MP tip 14p at the ABS 30-30 according to an embodiment of the present disclosure. MP leading side 14b1 is tapered and extends from the ABS 30-30 to MP bottom surface 14b2 that is aligned orthogonal to the ABS. Moreover, top surface 11t of the leading shield 11 is substantially parallel to the tapered MP leading side and separated therefrom by leading gap 13. MP trailing side 14t1 is also tapered, and connects at corner 14c with MP top surface 14t2 that is parallel to the MP bottom surface. In other embodiments (not shown), one or both of the MP leading and trailing sides that end at the ABS may be aligned orthogonal to the ABS and form a continuous planar surface with MP bottom and top surfaces, respectively. WG 16 is formed between MP trailing side 14t1 and a first TS front portion 17. The first TS also has a back portion 17e that is parallel to MP top surface 14t2, and is separated therefrom by the WG and dielectric layer 42 formed on the MP top surface. STO 22 has a front side 22f at the ABS and contacts the first TS at side 17b. In an alternative embodiment (not shown), the STO front side is recessed 2 nm to 100 nm from the ABS, and separated therefrom by the WG.

Figure 7A:
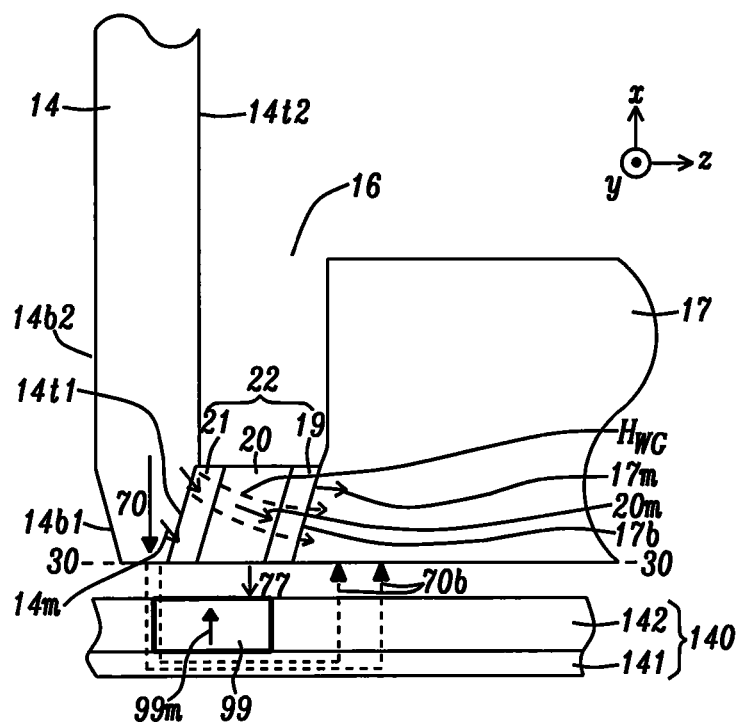
FIG. 7A is a down-track cross-sectional view of the STO in FIGS. 5A-5B that shows FGL magnetization substantially parallel to the WG field in the absence of an applied current, and FIG. 7B indicates that FGL magnetization flips when a current of sufficient density is applied across the STO from the first TS to the MP.

In FIG. 7A, STO 22 in FIG. 6 is enlarged to show pxL 21 formed on MP trailing side 14t1, and ppL 19 adjoining first TS 17. The write process is shown in an example where MP field 70 is pointing down (out of MP 14) in order to write a magnetic bit 99 with magnetization 99m pointing up in bit layer 142 on a soft underlayer 141 in magnetic medium 140. Return field 70b enters the trailing loop for magnetic flux return to the MP at first TS 17. The MP has a local magnetization 14m at the MP trialing side that is aligned substantially in the same direction as WG field $H_{WG}$ that proceeds from the MP to the first TS. Moreover, FGL 20 has magnetization 20m where both magnetizations 17m and 20m are substantially aligned with $H_{WG}$ in the absence of an applied current across the STO.

Figure 7B:
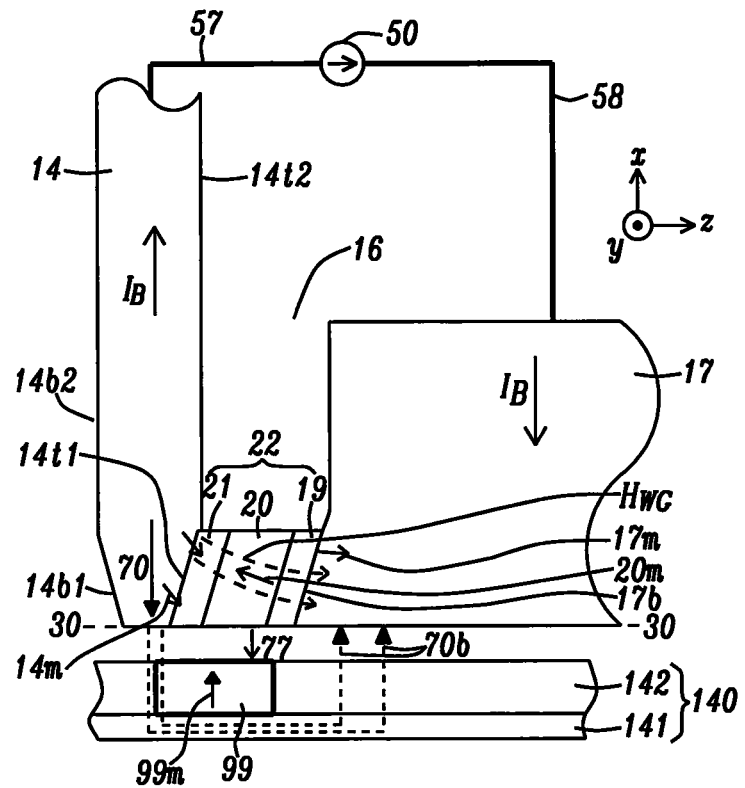
FIG. 7C illustrates FGL magnetization at a first cone angle α, which flips to a FGL magnetization with cone angle β when applied current $I_B$ has sufficient density according to an embodiment of the present disclosure.
Figure 7C:
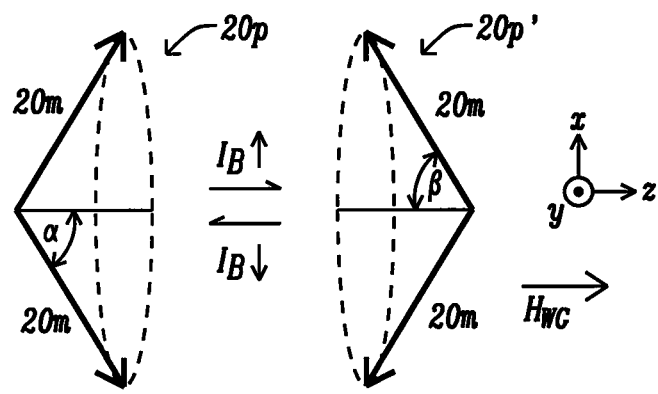

FIG. 7B shows that the writer of the present disclosure is capable of both of a MAMR assist and a spin torque reversal assisted magnetic recording (STRAMR) assist in the write process. In particular, at certain current densities for applied current $I_B$, magnetization 20m maintains a direction substantially parallel to $H_{WG}$ and has a precessional state 20p with cone angle α as depicted in FIG. 7C. As $I_B$ current density increases, cone angle α increases until magnetization 20m flips to precessional state 20p' where magnetization 20m now has cone angle β pointing substantially opposite to $H_{WG}$. In both precessional states, RF field 77 is generated and directed at bit layer 142 and lowers the write field necessary to switch bit magnetization 99m to provide a MAMR assist. However, a STRAMR assist is also present with precessional state 20p' and increases as cone angle β decreases to 0 degrees. The STRAMR assist results from increased reluctance in WG 16 and forces more magnetic flux 70 exit MP 14 as write field 70. In other words, only a MAMR assist is possible with precessional state 20p, but both of a MAMR and STRAMR assist may occur in precessional state 20p'.

Current $I_B$ is applied from a direct current (DC) source 50 through lead 58 and first TS 17, and across STO 22 from first TS side 17b to MP trailing side 14t1, and exits MP 14 through a second lead 57. Note that the flow of electrons is opposite to the $I_B$ direction and is from the MP to the first TS. It should be understood that the electrical current ($I_B$) direction required for the FGL to provide a STRAMR assist is from TS shield→spin preserving layer→FGL→non-spin preserving layer→MP. Furthermore, the $I_B$ direction is independent of the gap field direction. Thus, the $I_B$ direction stays the same when the write field (and $H_{WG}$) is switched to the opposite direction in order to write a transition.

STO device 22 is configured so that sufficient spin torque (not shown) is exerted on FGL 20 (from backscattered electrons from the first TS) to flip the FGL magnetization. The flipping mechanism is based on the behavior of electrons with spins parallel and anti-parallel to the moment in the first TS. The portion of electrons having a moment that is parallel to TS magnetization 17m is able to enter first TS 17 with very little resistance. However, electrons with a moment that is anti-parallel to first TS magnetization proximate to side 17b do not enter the first TS easily because of less unoccupied states in the first TS, and are backscattered to the FGL. As a result, spin torque is exerted on FGL magnetization 20m, and the FGL magnetization is flipped to a direction primarily oriented toward MP trailing side 14t1.

The degree of FGL magnetization flipping is determined by the magnitude of $I_B$ current density. A higher degree of flipping means that cone angle β is smaller and provides a greater STRAMR assist (lower MAMR assist) than at a lower $I_B$ current density that gives a lower degree of flipping. Improved STO devices are desired where a lower $I_B$ current density is required to provide a given amount (degree) of FGL magnetization flipping so that an improved STRAMR assist is realized with a minimum amount of write bubble fringing. Accordingly, there will be less STO device heating (better stability) and better EWAC performance while maintaining high TPI capability. This objective is achieved in STO 22 because outer FGL portions have a lower MsT than in the FGL center portion ($MsT_2 < MsT_1$) thereby allowing FGL magnetization flipping at a lower $I_B$ current density than in the prior art where the FGL has a uniform MsT throughout the layer.

Figure 8:
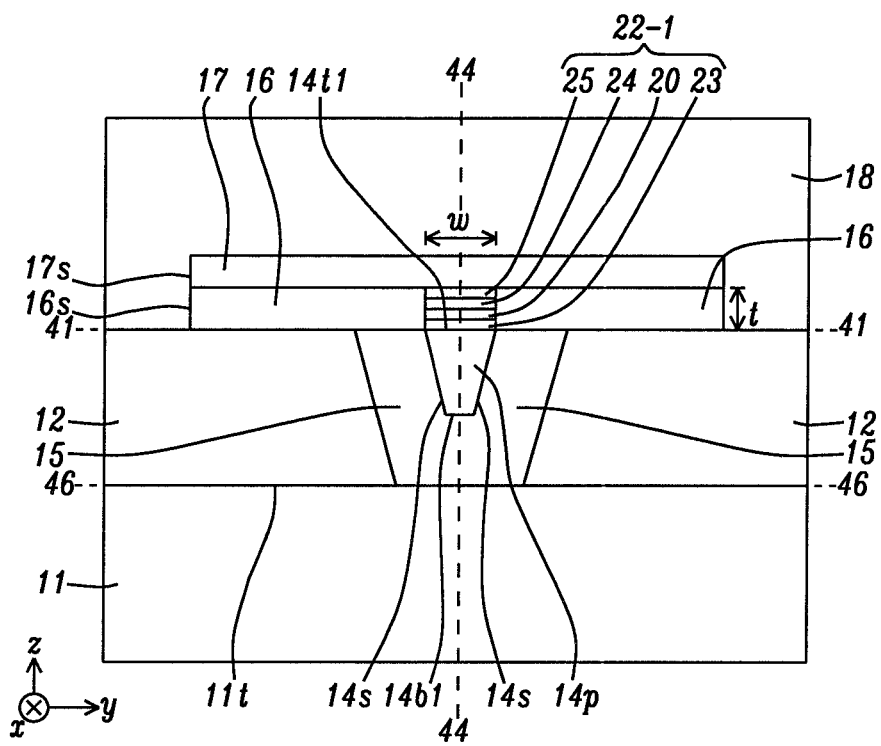
FIG. 8 shows an ABS view of a STO having four layers including a FGL, and formed in a WG according to another embodiment of the present disclosure.

According to another embodiment of the present disclosure illustrated in FIG. 8, STO 22 of the first embodiment may be replaced with STO 22-1 having a first non-magnetic spacer (NM1) 23, FGL 20, second non-magnetic spacer (NM2) 24, and spin polarization (SP) layer 25 sequentially formed on MP trailing side 14t1, and where the SP layer contacts first TS 17 at side 17b. This STO design was previously disclosed in related U.S. application Ser. No. 16/372,517. The SP layer may be comprised of one of the magnetic materials mentioned previously with respect to FGL 20, and generates spin torque on the FGL in the presence of $I_B$ with sufficient current density to cause FGL magnetization flipping to precessional state 20p' with cone angle β (FIG. 7C). NM1 and NM2 may be a single layer or multilayer films, and are preferably a non-magnetic metal with a long spin diffusion length such as Cu, Ag, or Au that serve as a spin preserving layer so that electrons spin polarized by the SP layer 25 do not encounter strong spin-flip scattering in the spacers. A key feature is that the FGL has outer portions 20x with a lower MsT than that in FGL center portion 20c similar to the FGL structure in FIG. 5B.

Figure 9A:
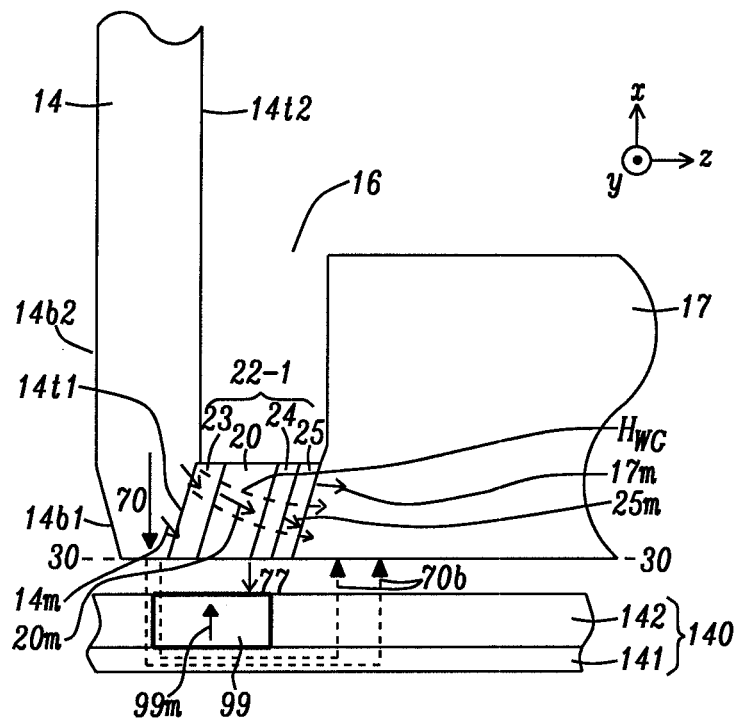
FIG. 9A is a down-track cross-sectional view of the STO in FIG. 8 that shows FGL magnetization substantially parallel to the WG field in the absence of an applied current.

In FIG. 9A, STO 22-1 is formed in WG 16 between MP trailing side 14t1 and first TS 17. Similar to the first embodiment, FGL magnetization is aligned substantially in the same direction as local MP magnetization 14m, local first TS magnetization 17m, and WG field $H_{WG}$ in the absence of applied current across the STO. Moreover, SP layer 25 has magnetization 25m that is ferromagnetically coupled with first TS magnetization 17m and is pointing toward the first TS.

Figure 9B:
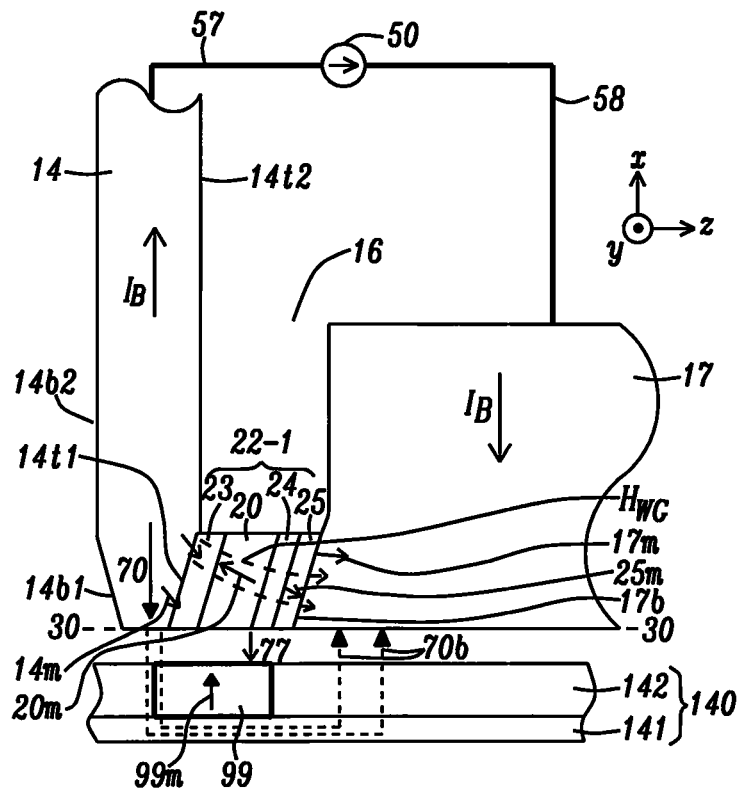
FIG. 9B depicts FGL magnetization flipping when a current of sufficient density is applied across the STO from the first TS to the MP.

Referring to FIG. 9B, when current $I_B$ with sufficient current density is applied from the first TS at first TS side 17b across STO 22-1 to the MP at MP trailing side 14t1, FGL magnetization flips to a direction substantially opposing the WG field. As in the previous embodiment, there is an advantage over the prior art in that the FGL flipping occurs at lower $I_B$ current density and bubble fringing is minimized because of lower MsT in outer FGL portions 20x than in FGL center portion 20c ($MsT_2 < MsT_1$).

The present disclosure also anticipates that other STO configurations may be employed rather than STO 22 and STO 22-1 described previously. For example, in related U.S. Pat. No. 10,490,216, a STO is disclosed where two spin polarization layers apply spin torque to a FGL from opposite sides. The spin torques are additive and create a larger spin torque than achieved with a single SP layer so that the $I_B$ current density is reduced for FGL magnetization flipping, or there is a greater FGL magnetization flipping at the same $I_B$ current density.

A magneto-static modeling study was performed to compare three writers with simplified assumptions. Head 1 is a process of record (POR) writer with a STO where the entire FGL has a MsT of 16 nmT, and assuming magnetization in the entire FGL is flipped. Head 2 is the POR writer with the assumption that only the center 20 nm width portion of the FGL is 100% flipped while a 10 nm outer FGL on each side of the center portion is not flipped at all. Head 3 is a writer according to an embodiment of the present disclosure where a center FGL portion that is 20 nm wide has $MsT_1=16$ nmT, outer FGL portions that are each 10 nm wide have a $MsT_2=8$ nmT, and magnetization in the entire FGL is flipped. Although the deep gap field is not uniform across the cross-track direction (gap field in the center is significantly larger than gap field off the center), the FGL in the new STO design (Head 3) will be substantially easier to flip than a FGL in a conventional STO (POR) writer. Thus, the actual behavior of the POR writer will be close to Head 2 and the actual behavior of the STO design in the present disclosure will be close to Head 3.

Figure 10:
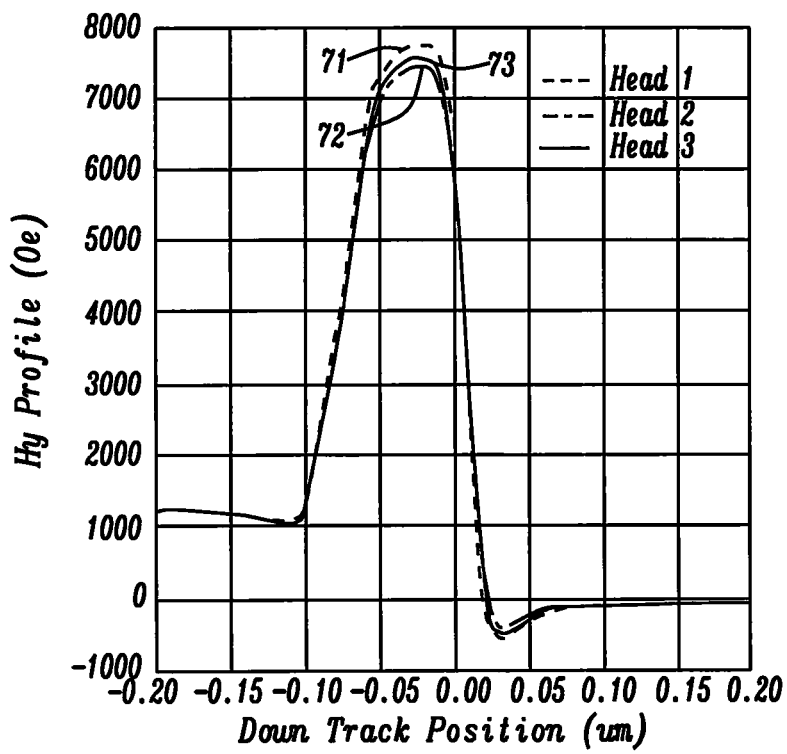
FIG. 10 illustrates results of a FEM simulation in the form of a down-track profile of the writer field and indicates a higher writer field and better field gradient are observed for a writer with a STO according to an embodiment of the disclosure than for a writer with a conventional STO.
Figure 11:
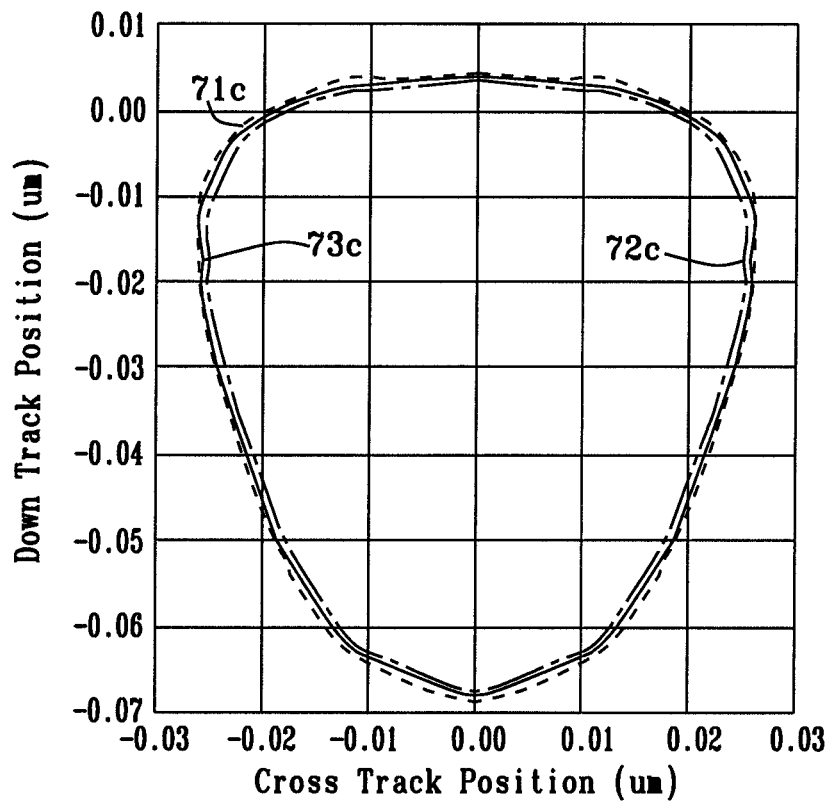
FIG. 11 depicts an ABS contour plot for the writers in FIG. 10 where the writer field is set at 5000 Oersted (Oe), and projects EWAC fringing where EWAC is erase width in an alternating current (AC) mode.

FIG. 10 illustrates that Head 3 (curve 73) has higher writer field and field gradient compared with Head 2 (curve 72). Head 1 results are represented with curve 71. In FIG. 11, Head 3 (curve 73c) shows essentially the same EWAC fringing as Head 2 (curve 72c). Meanwhile, Head 1 results are displayed as curve 71c. In an operating condition A where the base writer structure releases a strong field and both POR writers and the Head 3 design have a FGL that is 100% flipped (β cone angle proximate to 0 degrees in precessional state 20p' shown in FIG. 7C), the Head 3 design will assist center track writing in essentially the same magnitude as the POR writers. Head 3 will have an advantage over the POR writers in terms of less fringing and adjacent track interference (ATI). With an alternative operating condition B where a smaller $I_B$ current density is used and only magnetization in the outer FGL portions in Head 3 is flipped (β cone angle) while magnetization in the center FGL portion is not flipped (still cone angle α), which is effectively less than 100% FGL flipping, a stray field is induced in the side shields (SS) but the stray field is significantly smaller in the SS adjacent to the MP in Head 3 than in the SS adjacent to the MP in Head 2 (or Head 1). Accordingly, the Head 3 design effectively reduces the SS stray field as a result of having a lower MsT in the FGL outer portions than in a FGL center portion. Therefore, the writer with the STO according to the present disclosure is expected to provide better performance than a POR writer with a conventional STO in either of condition A (100% FGL flipping) or condition B (<100% FGL flipping).

The present disclosure also encompasses a process sequence for fabricating a STO comprised of a FGL having outer portions with a MsT less than a MsT in a FGL center portion. According to one embodiment of the present disclosure depicted in FIGS. 12-14, the feature where FGL outer portions have $MsT_2$, and FGL center portion has $MsT_1$ where $MsT_2 < MsT_1$, is produced by employing a NOX process to partially oxidize the FGL after the STO is patterned in the cross-track direction.

Figure 12:
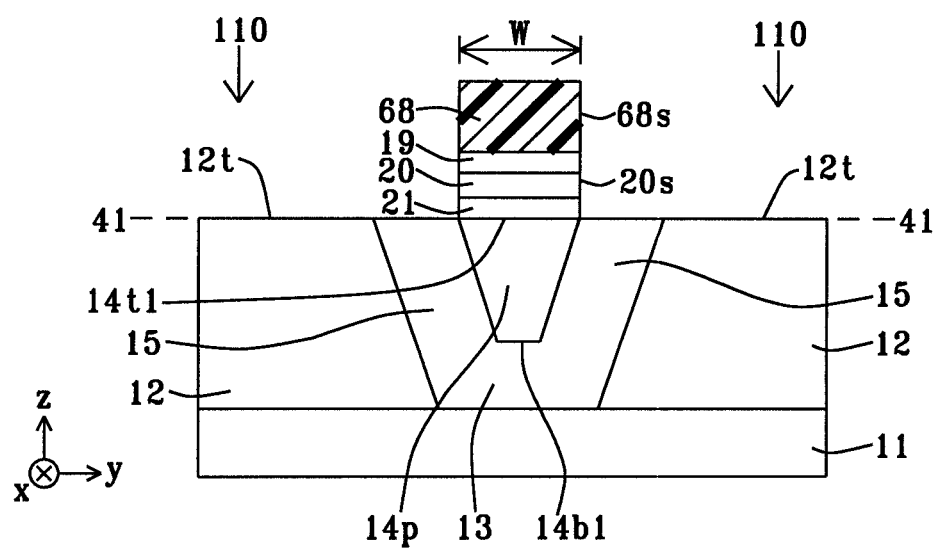
FIGS. 12-14 are ABS views showing a sequence of steps for forming a STO with a partially oxidized FGL, and where the STO sidewalls adjoin a WG according to an embodiment of the present disclosure.

Referring to FIG. 12, the partially formed writer structure including MP tip 14p that adjoins side gaps 15 and leading gap 13 is provided according to a conventional process sequence that is not described herein. Each side shield 12 has a top surface 12t that is coplanar with a trailing edge of the MP tapered trailing side 14t1 at plane 41-41, which is orthogonal to the subsequently formed ABS plane. In the exemplary embodiment, STO layers comprised of pxL 21, FGL 20, and ppL 19 are sequentially deposited on SS top surfaces, side gaps, and on the MP trailing side. Thereafter, a photoresist mask 68 with sides 68s that are separated by cross-track width w is formed on ppL 19, and above the MP trailing side, using a photolithography method well known in the art. Then, an ion beam etch (IBE) or reactive ion etch (RIE) 110 is performed to remove unprotected regions of the STO layers and stops on the SS top surfaces and side gaps. As a result, STO sidewalls including FGL sidewalls 20s are formed, and the FGL has a width substantially equal to w.

Figure 13:
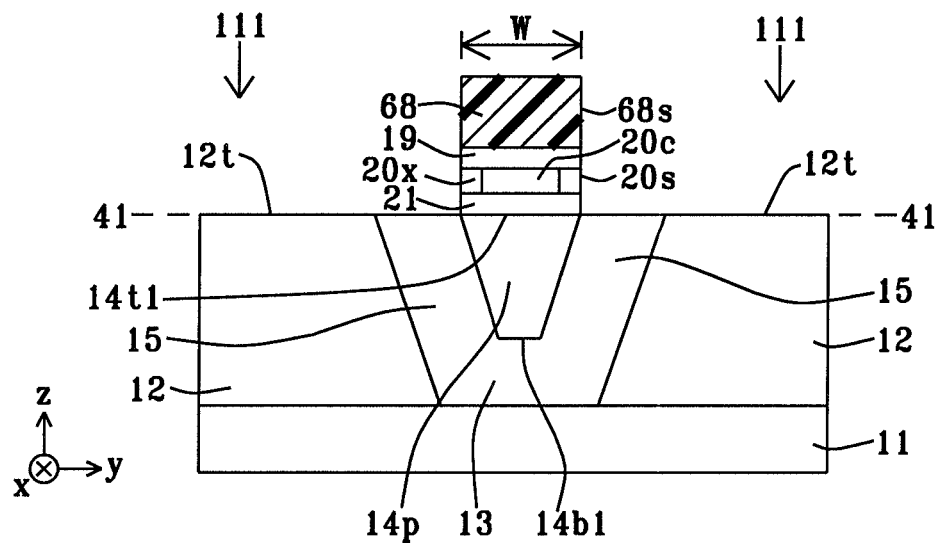

Referring to FIG. 13, a key step in the FGL formation process is a NOX step 111 that is used to partially oxidize FGL 20 to give oxidized outer FGL portions 20x having width w2, and an unoxidized center FGL portion 20c of width w1 described earlier and shown in FIG. 5B. NOX conditions are known in the art and are not described herein. There may be a continuous gradient in the extent of oxidation (and $MsT_2$) across each FGL outer portion such that the oxygen content decreases (and $MsT_2$ increases) with increasing distance from each FGL sidewall 20s until reaching an interface with the FGL center portion at a distance w2 from a FGL sidewall. Preferably, w1 is from 5 nm to 50 nm. As indicated earlier, $MsT_1$ of the FGL center portion is from 1-14 nmT while the $MsT_2$ in FGL outer portions is in the range of 1-8 nmT, and where $MsT_2<MsT_1$. However, the present disclosure anticipates that FGL outer portions may also be formed with a process that generates a substantially uniform $MsT_2$ therein.

Figure 14:
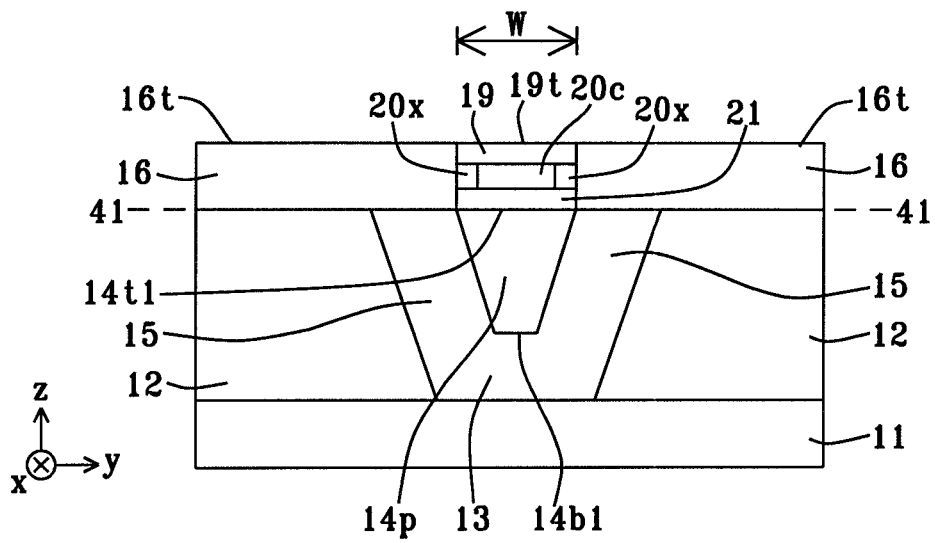

In FIG. 14, the partially formed writer is shown after WG 16 is deposited on SS top surfaces 12t, side gaps 15, and adjoining STO layers 19-21. A chemical mechanical polish (CMP) process may be performed to remove the photoresist mask and yield ppL top surface 19t that is coplanar with WG top surface 16t. Thereafter, conventional methods are employed to form the remainder of the write head in the writer structure, and then an ABS is typically formed with a lapping process.

While the present disclosure has been particularly shown and described with reference to, the preferred embodiments thereof, it will be understood by those skilled in the art that various changes in form and details may be made without departing from the spirit and scope of this disclosure.

We claim:

1. A spin torque magnetization reversal assisted magnetic recording (STRAMR) writer, comprising:
   (a) a main pole (MP) comprised of a trailing side having a track width w at an air bearing surface (ABS);
   (b) a write gap (WG) formed on the MP trailing side;
   (c) a first trailing shield (TS) on the WG and having a first side facing the MP; and
   (d) a spin torque oscillator (STO) formed in the WG between the MP trailing side and first side of the first TS, and comprising a flux guiding layer (FGL) with a magnetization aligned substantially parallel to a WG field ($H_{WG}$) in the absence of an applied current across the STO, and wherein the STRAMR writer is configured so that the FGL magnetization flips to a direction substantially opposing $H_{WG}$ when a current $I_B$ of sufficient magnitude is applied from the first TS across the STO to the MP, the FGL comprises:
   (1) a center portion having a first saturation magnetization×thickness product ($MsT_1$) and a first cross-track width w1 between two sides thereof; and
   (2) an outer portion adjoining each side of the FGL center portion and having a second cross-track width w2, and a second saturation magnetization×thickness product ($MsT_2$) where $MsT_2<MsT_1$.

2. The STRAMR writer of claim 1 wherein a sum (2w2+w1) is less than or equal to the track width of the MP trailing side.

3. The STRAMR writer of claim 1 wherein $MsT_1$ is from 1 nm×Tesla (nmT) to 14 nmT.

4. The STRAMR writer of claim 1 wherein w1 is from about 5 nm to 50 nm, and w2 is from about 5 nm to 20 nm.

5. The STRAMR writer of claim 1 wherein $MsT_2$ is from 1 nmT to 8 nmT.

6. The STRAMR writer of claim 1 wherein the FGL center portion is an unoxidized magnetic layer, and each FGL outer portion is an oxidized magnetic layer.

7. The STRAMR writer of claim 6 wherein an oxygen content in each FGL outer portion is a continuous gradient such that the oxygen content decreases and $MsT_2$ increases with increasing distance from a FGL sidewall up to the FGL center portion.

8. The STRAMR writer of claim 1 wherein $MsT_2$ is substantially uniform within each FGL outer portion.

9. The STRAMR writer of claim 1 wherein the STO further comprises a non-spin preserving layer (pxL) contacting the MP trailing side, and a spin preserving layer (ppL) adjoining the first side of the first TS to give a pxL/FGL/ppL STO configuration.

10. The STRAMR writer of claim 1 wherein the STO further comprises a first non-magnetic spacer (NM1) between the MP trailing side and a first side of the FGL, a second non-magnetic spacer (NM2) on a second side of the FGL, and a spin polarization (SP) layer on the NM2 to give a NM1/FGL/NM2/SP STO configuration.

11. The STRAMR writer of claim 1 wherein the FGL comprises one or more of layers of $Ni_xFe_{100-x}$, $Co_yFe_{100-y}$, $Co_zNi_{100-z}$, and where x, y, and z are from 0 atomic % to 100 atomic %, or alloys thereof with one or more additional elements.

12. The STRAMR writer of claim 9 wherein the pxL is a single layer or multilayer of one or more of Ta, W, Pt, Ru, Ti, and Pd so that spin polarized electrons in the applied current $I_B$ transiting the pxL will have a spin polarization randomized by spin flipping scattering.

13. The STRAMR writer of claim 9 wherein the ppL is Cu, Ag, Au, Al, or Cr, or an alloy thereof in which electrons in the applied current $I_B$ will substantially retain a spin polarization when traversing the ppL.

14. The STRAMR writer of claim 1 wherein the STO has a front side that is exposed at the ABS or is recessed behind the ABS to a height of 2 nm to 100 nm.

15. A head gimbal assembly (HGA), comprising:
   (a) the STRAMR writer of claim 1; and
   (b) a suspension that elastically supports the STRAMR writer, wherein the suspension has a flexure to which the STRAMR writer is joined, a load beam with one end connected to the flexure, and a base plate connected to the other end of the load beam.

16. A magnetic recording apparatus, comprising:
   (a) the HGA of claim 15;
   (b) a magnetic recording medium positioned opposite to a slider on which the STRAMR writer is formed;
   (c) a spindle motor that rotates and drives the magnetic recording medium; and (d) a device that supports the slider, and that positions the slider relative to the magnetic recording medium.

\* \* \* \* \*